United States Patent [19]

Hood

[11] Patent Number: 5,138,789
[45] Date of Patent: Aug. 18, 1992

[54] SPINNER AND FISHING LURE

[76] Inventor: Robin C. Hood, 3244 Harrow Pl., Charlotte, N.C. 28205

[21] Appl. No.: 816,169

[22] Filed: Jan. 2, 1992

[51] Int. Cl.[5] ............................................. A01K 85/00
[52] U.S. Cl. .................................. 43/42.13; 43/42.14; 43/42.19
[58] Field of Search ................... 43/42.19, 42.2, 42.17, 43/42.11, 42.13, 42.14, 42.5

[56] References Cited

U.S. PATENT DOCUMENTS

| | | | |
|---|---|---|---|
| 723,045 | 3/1903 | Shaffer | 43/42.14 |
| 2,261,433 | 11/1941 | Demory | 43/42.13 |
| 2,266,234 | 12/1941 | Mitchell | 43/42.13 |
| 2,471,499 | 5/1949 | Shipman | 43/42.13 |
| 4,201,008 | 5/1980 | Sparkman | 43/42.14 |
| 4,794,721 | 1/1989 | Rowe | 43/42.13 |

FOREIGN PATENT DOCUMENTS 606994  8/1948  United Kingdom ............... 43/42.19

Primary Examiner—Kurt Rowan
Attorney, Agent, or Firm—Adams, III W. Thad

[57] ABSTRACT

A spinner for use on a fishing lure, and a fishing lure incorporating the spinner. The fishing lure includes a metal blank deformed to define a pair of hydrodynamic blades on one end of the metal blank. The metal blank has lugs at opposite ends thereof bent in parallel planes at substantially right angles to the plane of the blank on a first major side of the blank. The lugs have respective holes therein for receiving a spinner-supporting wire along an axis of rotation, the holes being enlarged in relation to the diameter of the wire in order to permit free rotation of the spinner on the blank. A first elongate journal is stamped from the metal blank between the lugs and extends outwardly from a second major side of the blank opposite from the first major side and extends along the axis of rotation of the spinner. The first journal extends outwardly from the second major side a distance sufficient to permit the spinner to rotate concentrically and symmetrically around the wire.

19 Claims, 10 Drawing Sheets

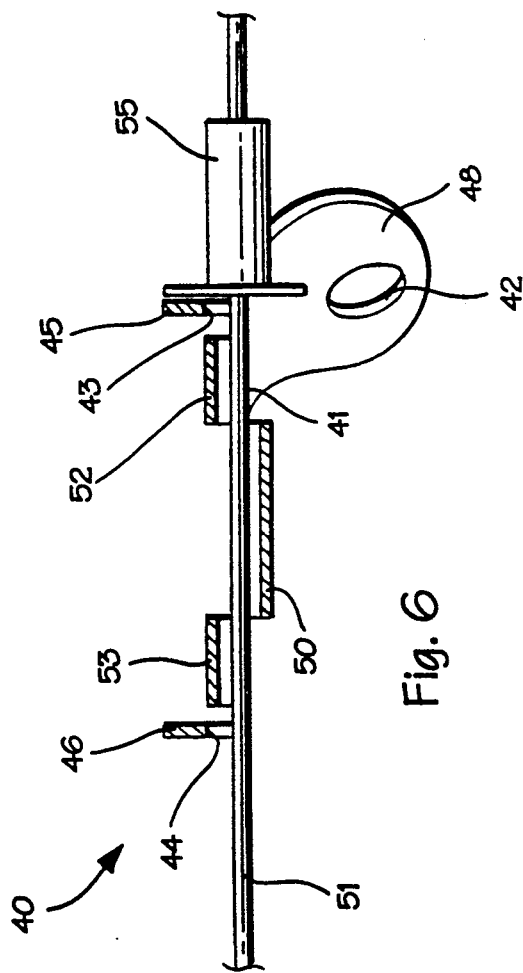
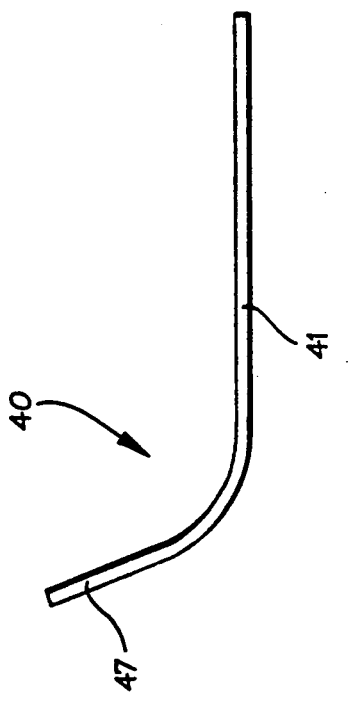

SPINNER AND FISHING LURE

TECHNICAL FIELD AND BACKGROUND OF THE INVENTION

This invention relates to fishing lures, specifically a spinner for use on a fishing lure and a fishing lure which includes the novel spinner. Many different types of spinners are known in the fishing lure art. One type of spinner is a "propeller"-type spinner which has hydrodynamic blades. The blades rotate as the lure is drawn through the water in direct relation to the speed with which the lure is drawn through the water. The spinner makes noise as it is drawn through the water. Typically, these lures are used for surface or near-surface fishing. The fisherman can control the noise made by the speed with which he draws the lure through the water.

Prior art designs of spinners use means of mounting the spinner on a wire which causes the spinner to rotate either off-center to the line of symmetry of the spinner, or at an angle to the axis of rotation of the spinner. The present invention provides a spinner which is easily fabricated from a single metal blank, but which permits the spinner to rotate symmetrically along the line of symmetry of the spinner.

The fishing lure according to the invention provides an arrangement which is steerable and produces a sharp "V" wake as it is drawn through the water.

SUMMARY OF THE INVENTION

Therefore, it is an object of the invention to provide a spinner for a fishing lure which is easily constructed out of a single metal blank.

It is another object of the invention to provide a spinner which rotates about the line of symmetry of the spinner.

It is another object of the invention to provide a spinner which makes a distinctive noise as it is pulled through the water.

It is another object of the invention to provide a fishing lure which includes the spinner disclosed in the application.

It is another object of the invention to provide a fishing lure which includes three spinners.

It is another object of the invention to provide a fishing lure which is steerable.

It is another object of the invention to provide a fishing lure which produces a sharp "V"-wake as it is pulled through the water.

These and other objects of the present invention are achieved in the preferred embodiments disclosed below by providing a spinner for use on a fishing lure, the fishing lure comprising a metal blank deformed to define a pair of hydrodynamic blades on one end of the metal blank. The metal blank has lugs at opposite ends thereof bent in parallel planes at substantially right angles to the plane of the blank on a first major side of the blank. The lugs have respective holes therein for receiving a spinner-supporting wire along an axis of rotation, the holes being enlarged in relation to the diameter of the wire in order to permit free rotation of the spinner on the blank. A first elongate journal is stamped from the metal blank between the lugs and extends outwardly from a second major side of the blank opposite from the first major side and extends along the axis of rotation of the spinner. The first journal extends outwardly from the second major side a distance sufficient to permit the spinner to rotate concentrically and symmetrically around the wire.

According to one preferred embodiment of the invention, a second journal is positioned between one of the lugs and one end of the first journal and extending outwardly from the first major side adjacent one of the lugs. A third journal is positioned between the other of the lugs and the other end of the first journal and extends outwardly from the first major side adjacent the other of the lugs. The second and third journals extend outwardly from the first major side a distance sufficient to provide a spaced bearing surface for the spinner to permit the spinner to rotate concentrically and symmetrically around the wire.

According to another preferred embodiment of the invention, the spinner includes a grommet loosely positioned on the wire adjacent the end of the blank having the blades for providing a bearing surface against which the blank rotates, the grommet adapted to create noise a the rotating blank bears against the grommet.

According to yet another preferred embodiment of the invention, the distance defined by the space between the first journal and the second and third journals is at least twice the diameter of the wire.

According to yet another preferred embodiment of the invention, the spinner includes a plurality of holes formed in the blades.

According to one preferred embodiment of the fishing lure according to the invention, the fishing lure comprises a fish hook, an elongate wire shank mounting the hook on one end thereof and a cross-wire mounted or integrally-formed on the end of the shank opposite the hook. A first spinner is carried on the same end of the shank on which the cross-wire is mounted. Second and third spinners are mounted on respective opposing ends of the cross-wire. Each of the spinners comprises a metal blank deformed to define a pair of hydrodynamic blades on one end of the metal blank, the metal blank having lugs at opposite ends thereof bent in parallel planes at substantially right angles to the plane of the blank on a first major side of the blank. The lugs have respective holes for receiving a spinner-supporting wire along an axis of rotation. The holes are enlarged in relation to the diameter of the wire in order to permit free rotation of the spinner on the blank. A first elongate journal is stamped from the metal blank between the lugs and extends outwardly from a second major side of the blank opposite from the first major side and extends along the axis of rotation of the spinner. The first journal extends outwardly from the second major side a distance sufficient to permit the spinner to rotate concentrically and symmetrically around the wire.

According to one preferred embodiment of the invention, the lure includes two spinners positioned for coaxial rotation on a single wire.

According to another preferred embodiment of the invention, the two spinners are mounted for rotation on the single wire on substantially the same axially-extending position on the wire.

According to another preferred embodiment of the invention, the lure includes a plurality of filaments attached to the shank adjacent the hook.

According to yet another preferred embodiment of the invention, the lure includes adjusting means for adjusting the angle of articulation of the hook in relation to the shank.

According to yet another preferred embodiment of the invention, the lure includes first and second generally fish-shaped metal plates mounted on respective opposing ends of the cross-wire instead of spinners.

BRIEF DESCRIPTION OF THE DRAWINGS

Some of the objects of the invention have been set forth above. Other objects and advantages of the invention will appear as the invention proceeds when taken in conjunction with the following drawings, in which:

FIG. 6 is a fragmentary vertical cross-sectional view showing the means for mounting the spinner on the wire;

FIG. 7 is a fragmentary elevation showing the angle of bend of the hydrodynamic surfaces of the blade;

DESCRIPTION OF THE PREFERRED EMBODIMENT AND BEST MODE SPINNER

Figure 1:
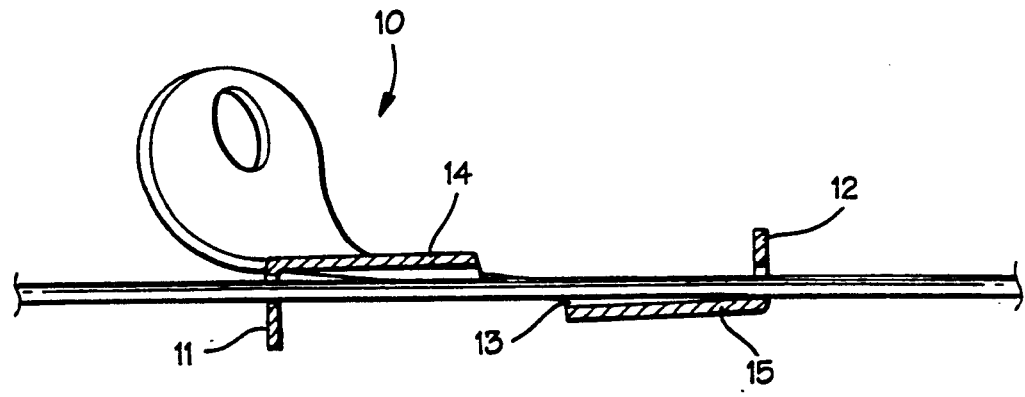
FIG. 1 is a cross-sectional view of a spinner according to a prior art design.
Figure 2:
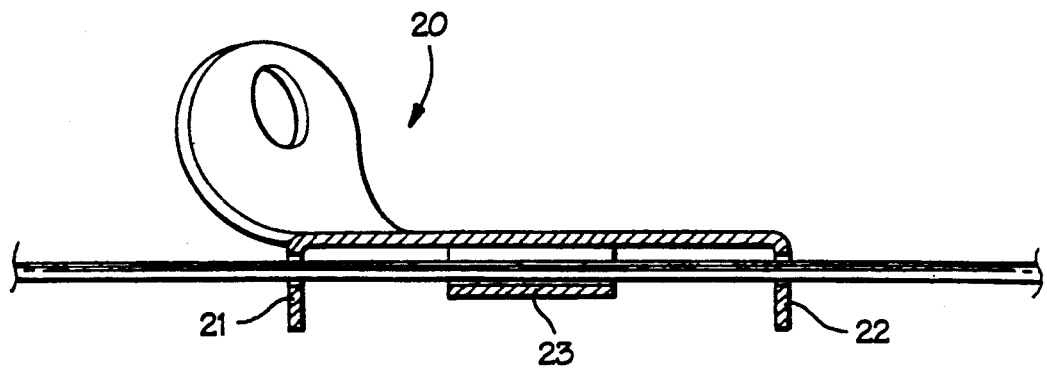
FIG. 2 is a cross-sectional view of a spinner according to another prior art design.
Figure 3:
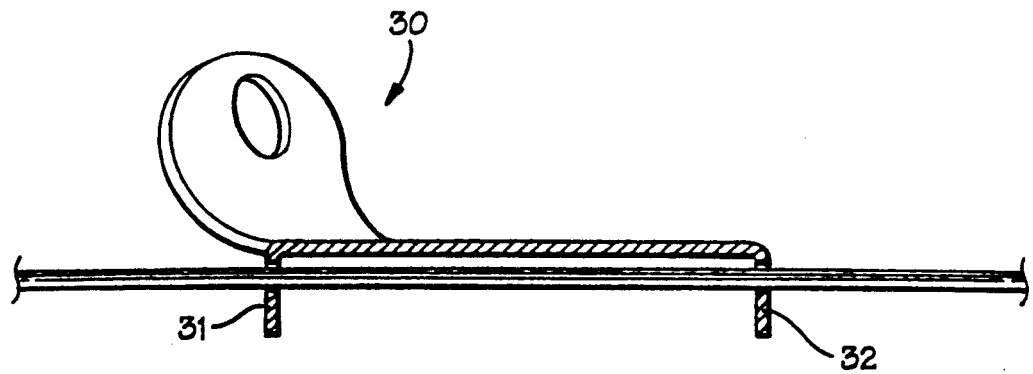
FIG. 3 is a cross-sectional view of a spinner according to yet another prior art design.
Figure 4:
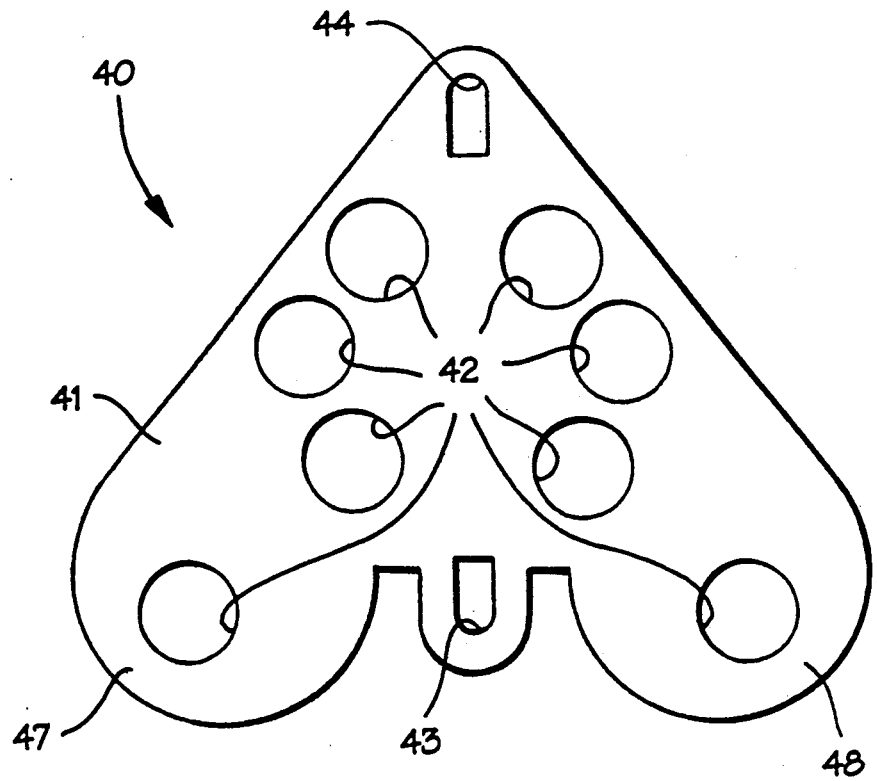
FIG. 4 is a plan view of a metal blank from which an embodiment of the spinner is made.

Referring now specifically to the drawings, spinners according to three known prior art designs are illustrated in FIGS. 1, 2 and 3.

In FIG. 1, a spinner 10 according to the prior art includes a pair of lugs 11 and 12 which extend outwardly from opposing major sides of the spinner in parallel planes. A opening through the spinner at the approximate midpoint separates a pair of conical protrusions 14 and 15 extending outwardly from opposite sides of the spinner. This causes the spinner 10 to rotate at a slight angle to the line of symmetry of the spinner. This spinner is disclosed in U.S. Pat. No. 4,201,008.

In FIG. 2, a spinner 20 according to another prior art design is illustrated which has a pair of lugs 21 and 22 which extend outwardly from the same major side of the spinner 20 in parallel planes. A journal 23 is stamped from the blank from which the spinner 20 is made. The journal 23 is positioned on the same major side of the spinner between the two lugs. This spinner rotates substantially off-center and therefore eccentrically as it is pulled through the water.

In FIG. 3 a spinner 30 according to another prior art design is illustrated which has pair of lugs 31 and 32 which extend outwardly from the same major side of the spinner 30 in parallel planes. This spinner rotates substantially off-center and therefore eccentrically as it is pulled through the water, just as the spinner 20 shown in FIG. 2.

Figure 5:
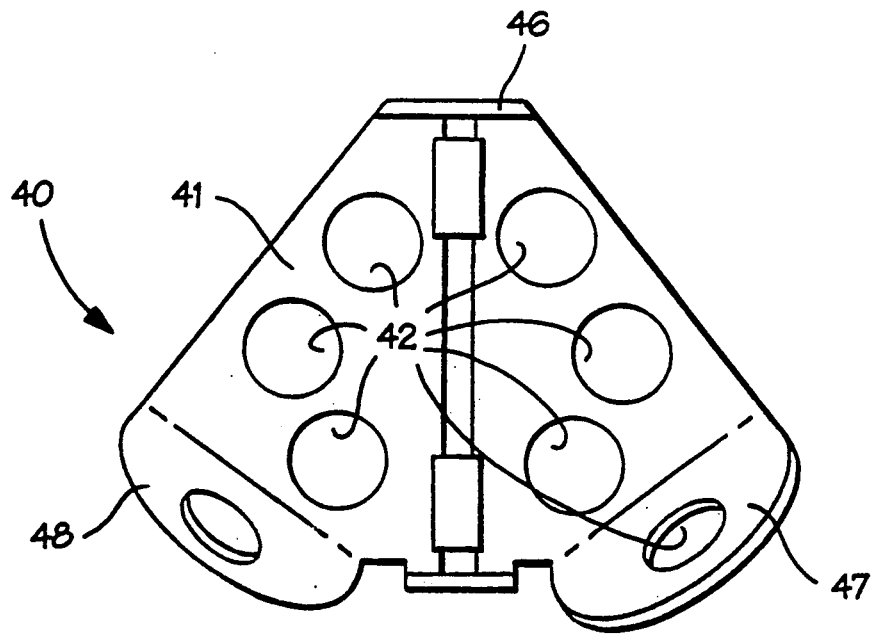
FIG. 5 is a plan view of the metal blank formed into the spinner.

A spinner 40 according to an embodiment of the invention is illustrated in FIGS. 4–7, inclusive. Spinner 40 is produced from a blank 41 of metal such as aluminum by stamping. Blank 41 is generally heart-shaped and in the embodiment of FIG. 4 includes a plurality of holes 42 which create noise as the spinner 40 is drawn through the water. Spinner 40 also includes holes 43 and 44. The area of the blank 41 surrounding holes 43 and 44 are bent upwardly at an approximate 90 degree angle to the plane of the blank 41 to form a pair of lugs 45 and 46, as is best shown in FIGS. 5 and 6. The lugs 45 and 46 extend outwardly from the same major side of the spinner 40, as is best shown in FIG. 5. As is also shown in FIG. 5, opposed lobes 47 and 48 of the blank 41 are bent in opposite directions to form hydrodynamic surfaces to impart rotation to the spinner 40 when pulled through the water.

The angle of bend in the lobes 47 and 48 from the plane of the blank 41 is shown in FIG. 7.

Referring again to FIG. 6, a first journal 50 is stamped from blank 41 and extends outwardly from the major surface of the spinner 40 opposite from the lugs 45, 46 and substantially equidistant the two lugs 45, 46. A first journal 50 is substantially semi-circular in cross-section and provides a bearing surface for a wire 51 on which the spinner 40 is mounted for rotation. Second and third journals 52 and 53 are stamped from the blank 41 and extend outwardly from the sam major surface of the blank 41 as the lugs 45 and 46.

Journals 52 and 53 are substantially semi-circular in cross-section and provide a bearing surface for wire 51 on which the spinner 40 is mounted for rotation, and provide support to the wire 51 on the side opposite journal 50 as the spinner 40 rotates. This arrangement provides for a very precise, even and symmetrical rotation of the spinner 40 along the line of symmetry of the spinner 40.

As is also shown in FIG. 6, spinner 40 is mounted on wire 51 and rotates against a grommet 55. The hydrodynamic pressure of the spinner 40 against grommet 55 creates a noise which may increase the attractiveness of the lure to fish.

FISHING LURES

Several lures according to the invention are shown in FIGS. 8-13.

Figure 8:
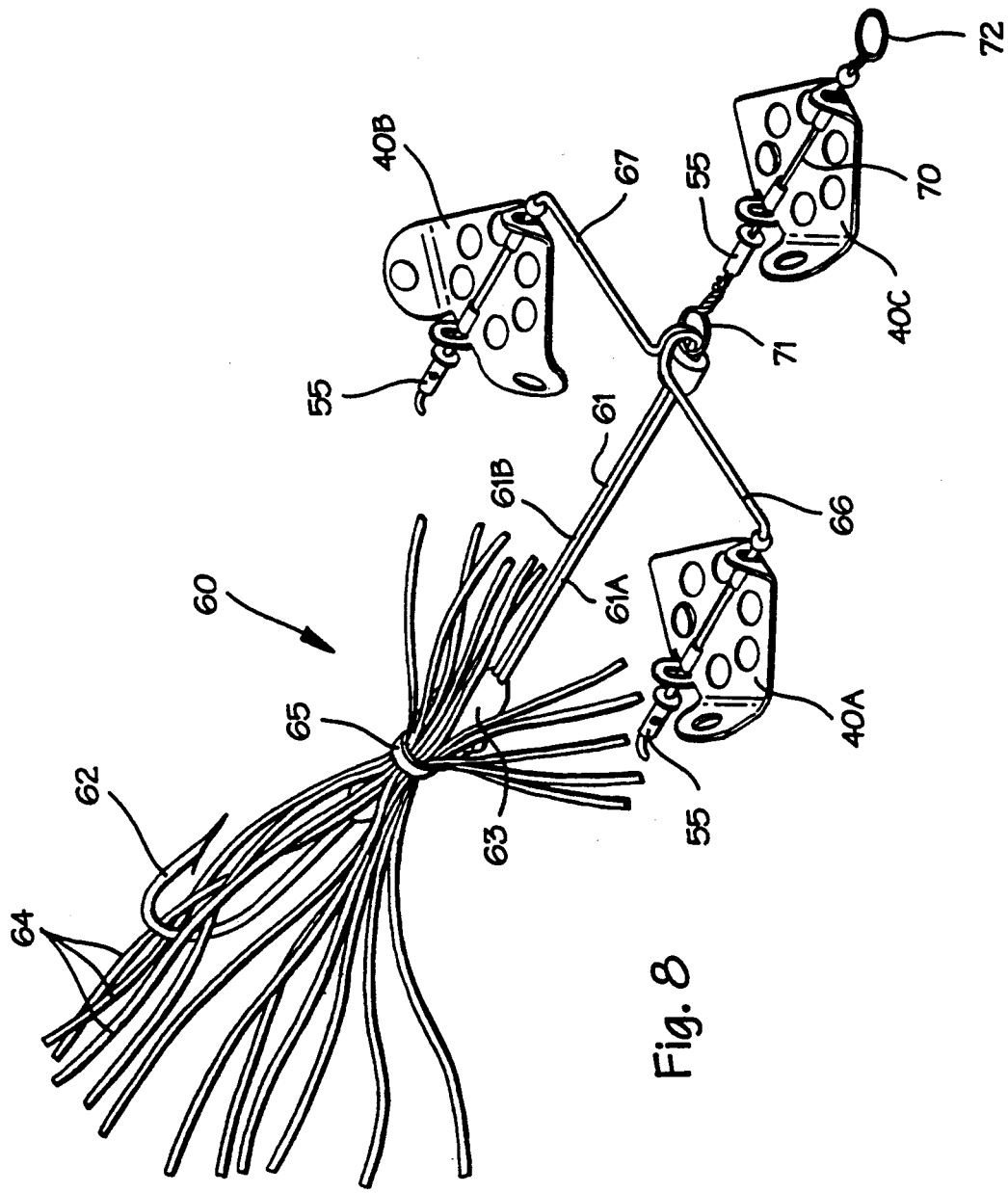
FIG. 8 is a perspective view of a fishing lure according to a preferred embodiment of the invention.

Lure 60 shown in FIG. 8 includes a wire shank 61 onto one end of which is mounted a hook 62. Wire shank 61 is preferably formed of a pair of wires 61A and 61B. Hook 62 is mounted on shank 61 by means of a lead weight 63. The angle of articulation of the hook 62 in relation to shank 61 can be adjusted by bending the wire shank 61 at the point where the wire shank enters the weight 63.

Figure 14:
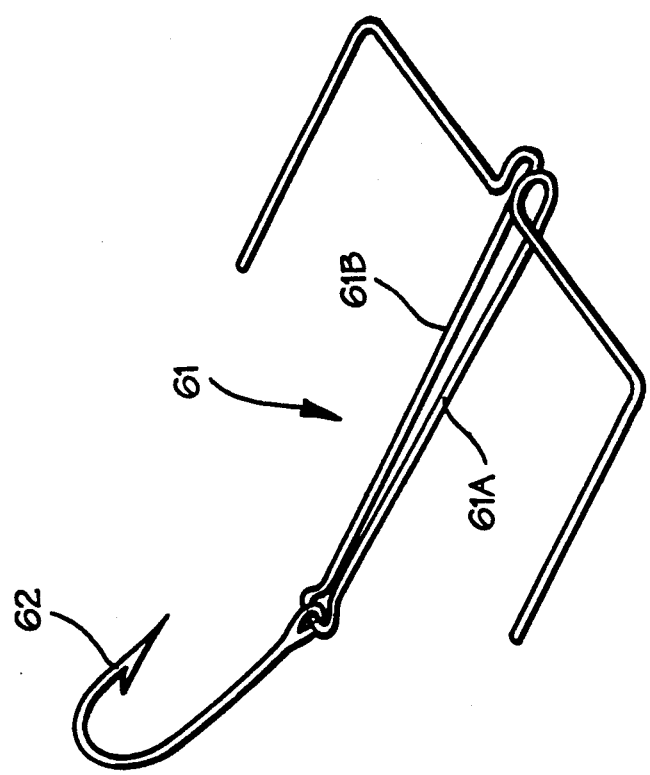
FIG. 14 is a fragmentary view of a preferred manner of attaching th fish hook to the shank of the lure.

The two wires which form shank 61 may be separately molded into weight 63 or the ends of the two wires 61A and 61B may be connected together. Preferably, the two wires 61A and 61B may actually comprise the center segment of a single wire which is bent into a eye before being molded into the weight 63. This configuration is illustrated in FIG. 14. The eye of the hook 62 may be hooked over the eye of the wire 61 to positively lock the shank 61 and the hook 62 together. With this arrangement the hook 62 will not separate from the shank 61 even if the weight 63 should break off.

A number of attractant filaments 64 are attached in surrounding relation to lead weight 63 by an elastic band 65 or by other suitable means.

The end of shank 61 opposite the hook 62 is bent in two pairs of successive right-angle bends to form a pair of cross-wires 66 and 67. Two spinners 40A and 40B as described above as spinner 40 are mounted on opposite ends of cross-wires 66 and 67 and held in place by grommets 55 secured to the respective opposed ends of cross-wires 66 and 67 by suitable means. Note that the two spinners 40 are counter-rotating. This is necessary in order to keep the lure 60 from continuously flipping over and over as it moves through the water.

A third spinner 40C as described above as spinner 40 is mounted on a short length of wire 70. A jump ring 71 attaches the spinner 40C to shank 61, and a further jump ring 72 permits attachment of the lure 60 to a fishing line (not shown).

Figure 9:
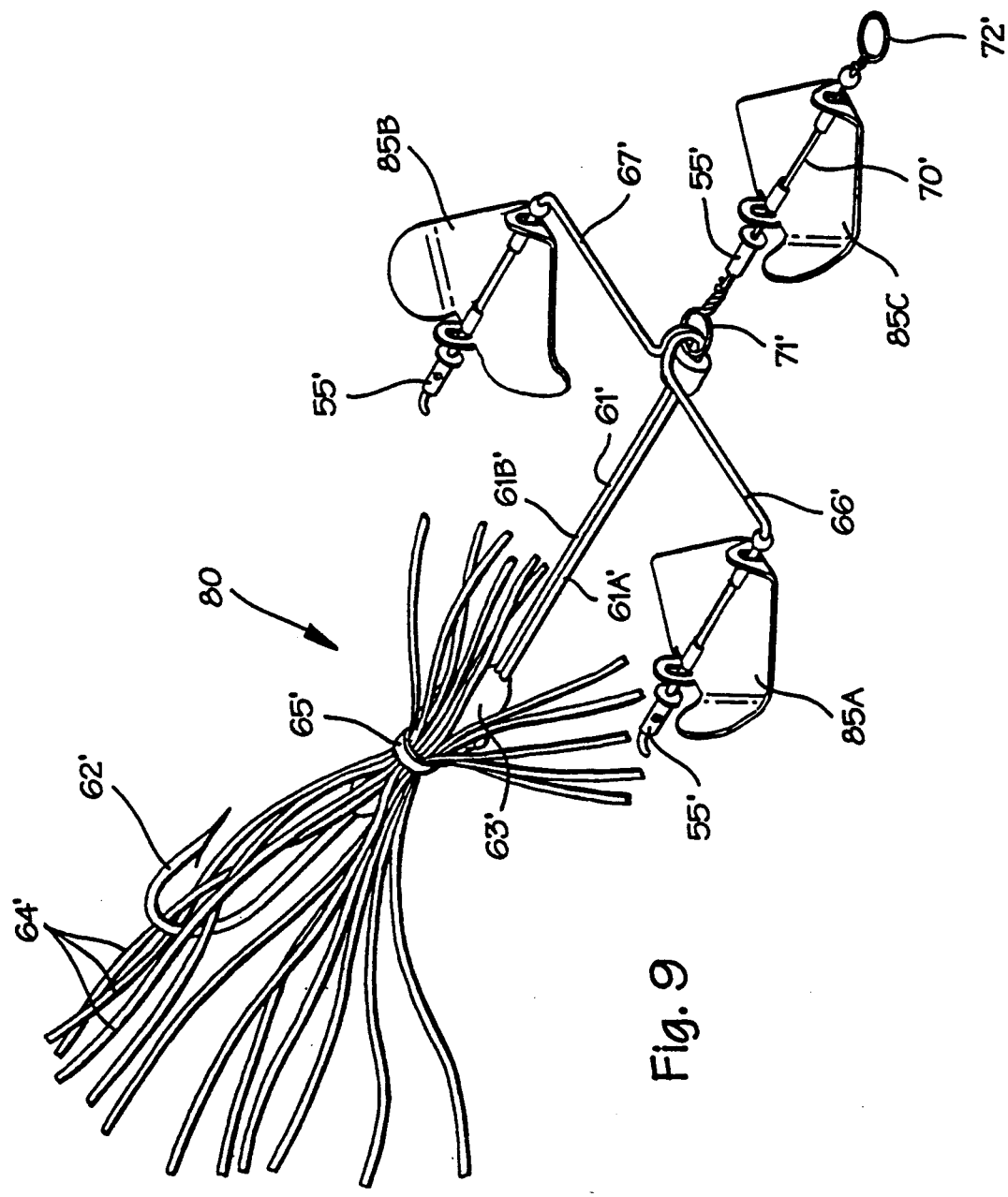
FIG. 9 is a perspective view of a fishing lure according to another preferred embodiment of the invention.

A further embodiment of the invention is shown in FIG. 9 as lure 80. Like elements in FIG. 9 to those elements shown in FIG. 8 are shown with prime notation, and the description above is incorporated by reference. In FIG. 9, spinners 85A, 85B and 85C are mounted as shown and as described above with reference to FIG. 8. Spinners 85A, 85B and 85C are constructed identically to spinner 40 except that the holes 42 in the blank 41 of spinner 40 have been omitted in spinner 85.

Figure 10:
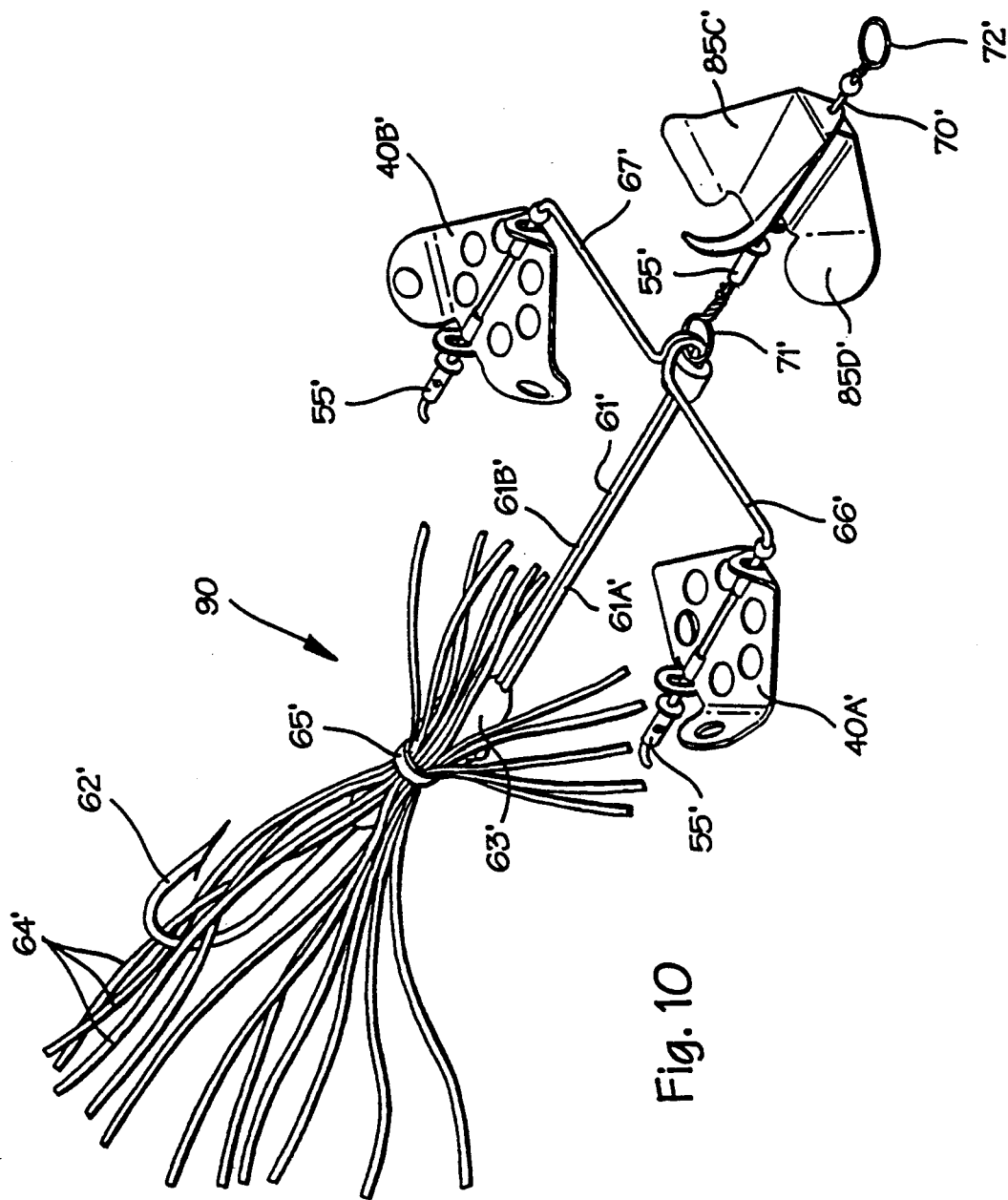
FIG. 10 is a perspective view of a fishing lure according to yet another preferred embodiment of the invention.

A further embodiment of the invention is shown in FIG. 10 as lure 90. Like elements in FIG. 10 to those elements shown in FIGS. 8 and 9 are shown with prime notation, and the description above is incorporated by reference. In FIG. 10, spinners 40A', 40B', and 85C' are mounted as shown and as described above with reference to FIGS. 8 and 9. Spinner 85C' is constructed similarly to prior art spinner 30. In addition, a spinner 85D is mounted on wire 70' in the same axial position as spinner 85C' and thus affects the drag of the lure 90 through the water and the noise created by the movement of the lure 90 through the water. Spinners 85C' and 85D are identical.

Figure 11:
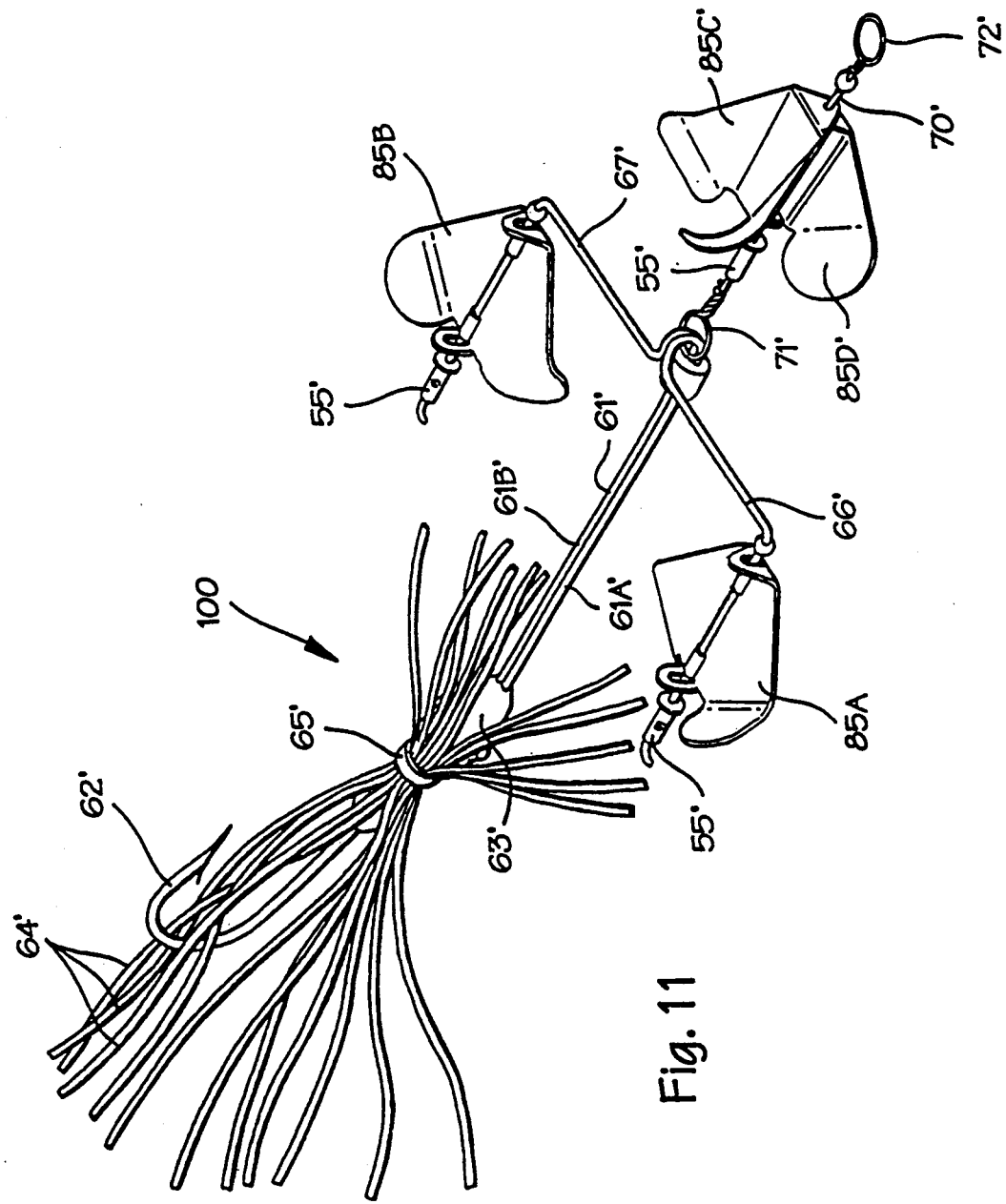
FIG. 11 is a perspective view of a fishing lure according to yet another preferred embodiment of the invention.

A further embodiment of the invention is shown in FIG. 11 as lure 100. Like elements in FIG. 11 to those elements shown in FIGS. 8, 9 and 10 are shown with prime notation, and the description above is incorporated by reference. In FIG. 11, spinners 85A, 85B, 85C' and 85D are mounted as shown and as described above with reference to FIGS. 8, 9 and 10. Spinners 85A, 85B, 85C' and 85D are constructed identically to spinners 40 and 30, respectively.

Figure 12:
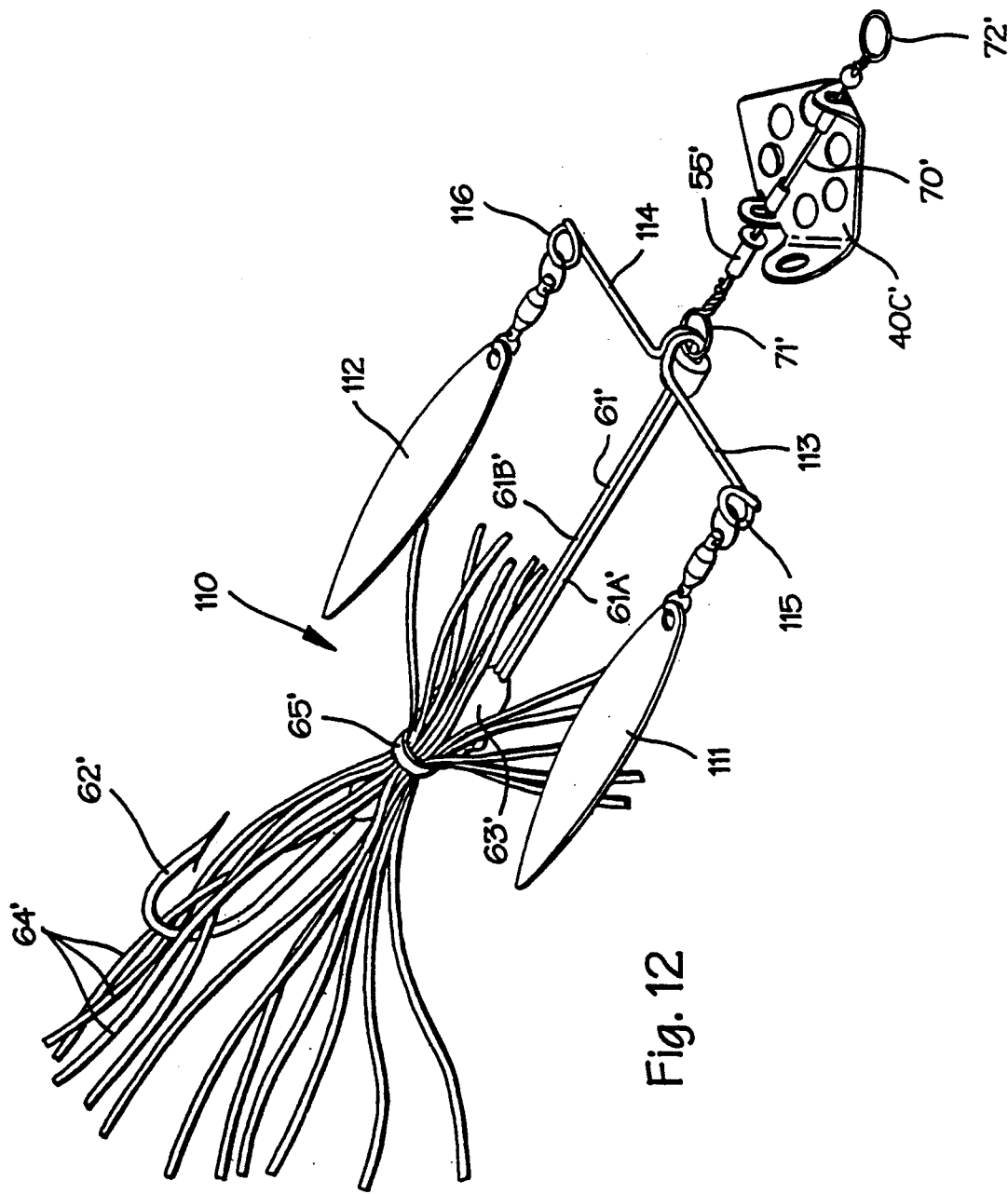
FIG. 12 is a perspective view of a fishing lure according to yet another preferred embodiment of the invention.

A further embodiment of the invention is shown in FIG. 12 as lure 110. Like elements in FIG. 12 to those elements shown in FIG. 8 are shown with prime notation, and the description above is incorporated by reference. In FIG. 12, spinner 40C' is mounted on wire 70' as shown and as described above with reference to FIG. 8. Instead of spinners, elongated, generally fish-shaped metal plates 111 and 112 are mounted on the ends of cross-wires 113 and 114, respectively. As is shown in FIG. 12, the ends of cross-wires 113 and 114 are bent into eyes 115 and 116, respectively in order to receive the metal plates 111 and 112.

Figure 13:
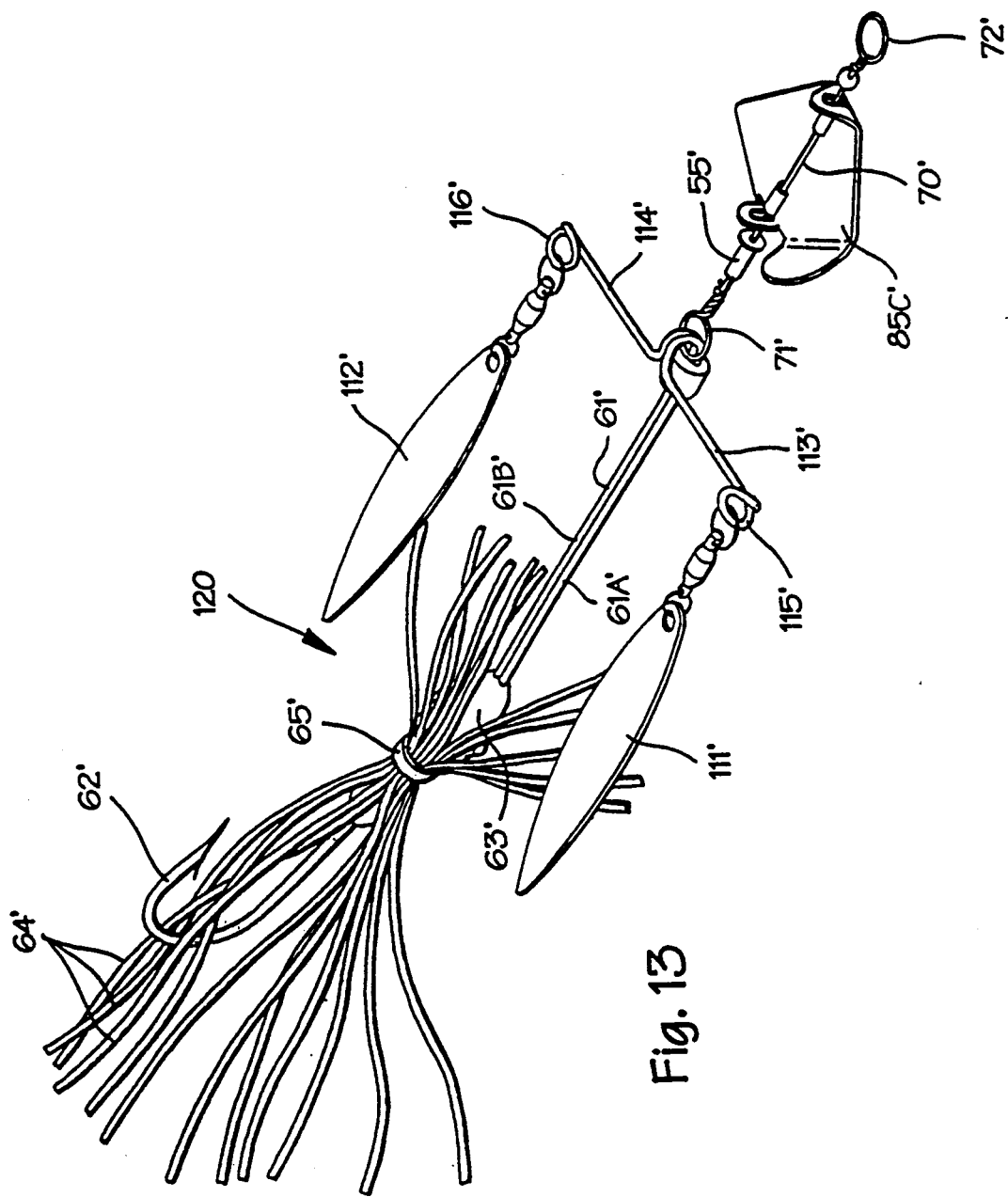
FIG. 13 is a perspective view of a fishing lure according to yet another preferred embodiment of the invention.

A further embodiment of the invention is shown in FIG. 13 as lure 120. Like elements in FIG. 13 to those elements shown in FIGS. 8, 9 and 12 are shown with prime notation, and the description above is incorporated by reference. In FIG. 13, spinner 85C is mounted on wire 70' as shown and as described above with reference to FIG. 9. Instead of spinners, elongated, generally fish-shaped metal plates 111' and 112' are mounted on the ends of cross-wires 113' and 114', respectively. As is shown in FIG. 12, the ends of cross-wires 113' and 114' are bent into eyes 115' and 116', respectively in order to receive the metal plates 111' and 112'.

A spinner and fishing lure according to several embodiments are described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A spinner for use on a fishing lure, said fishing lure comprising:
   (a) a metal blank deformed to define a pair of hydrodynamic blades on one end of said metal blank, said metal blank having lugs at opposite ends thereof bent in parallel planes at substantially right angles to the plane of the blank on a first major side of said blank, said lugs having respective holes therein for receiving a spinner-supporting wire along an axis of rotation, said holes being enlarged in relation to the diameter of the wire in order to permit free rotation of said spinner on said blank;
   (b) a first elongate journal stamped from the metal blank between said lugs and extending outwardly from a second major side of said blank opposite from said first major side and extending along the axis of rotation of said spinner, said first journal extending outwardly from the second major side a distance sufficient to permit said spinner to rotate concentrically and symmetrically around said wire.

2. A spinner according to claim 1, wherein said blank includes:
   (a) a second journal positioned between one of said lugs and one end of said first journal and extending outwardly from the first major side adjacent one of said lugs;
   (b) a third journal positioned between the other of said lugs and the other end of said first journal and extending outwardly from the first major side adjacent the other of said lugs; said second and third journals extending outwardly from the first major side a distance sufficient to provide a spaced bearing surface for said spinner to permit said spinner to rotate concentrically and symmetrically around said wire.

3. A spinner according to claim 2, and including a grommet loosely positioned on said wire adjacent the end of the blank having the blades for providing a bearing surface against which said blank rotates, said grommet adapted to create noise as said rotating blank bears against said grommet.

4. A spinner according to claim 2, wherein the distance defined by the space between said first journal and said second and third journals is at least twice the diameter of the wire.

5. A spinner according to claim 1, wherein said spinner includes a plurality of holes formed in the blades.

6. A fishing lure, comprising:
   (a) a fish hook;
   (b) an elongate wire shank mounting said hook on one end thereof;

(c) a cross-wire mounted on the end of the shank opposite said hook;

(d) a first spinner carried on the same end of the shank on which the cross-wire is mounted;

(e) second and third spinners mounted on respective opposing ends of said cross-wire, each of said spinners comprising:

(f) metal blank deformed to define a pair of hydrodynamic blades on one end of said metal blank, said metal blank having lugs at opposite ends thereof bent in parallel planes at substantially right angles to the plane of the blank on a first major side of said blank, said lugs having respective holes therein for receiving a spinner-supporting wire along an axis of rotation, said holes being enlarged in relation to the diameter of the wire in order to permit free rotation of said spinner on said blank;

(g) a first elongate journal stamped from the metal blank between said lugs and extending outwardly from a second major side of said blank opposite from s id first major side and extending along the axis of rotation of said spinner, said first journal extending outwardly from the second major side a distance sufficient to permit said spinner to rotate concentrically and symmetrically around said wire.

7. A lure according to claim 6, wherein each of said blanks includes:

(a) a second journal positioned between one of said lugs and one end of said first journal and extending outwardly from the first major side adjacent one of said lugs;

(b) a third journal positioned between the other of said lugs and the other end of said first journal and extending outwardly from the first major side adjacent the other of said lugs; and (c) said second and third journals extending outwardly from the first major side a distance sufficient to provide a spaced bearing surface for said spinner to permit said spinner to rotate concentrically and symmetrically around said wire.

8. A lure according to claim 7, and including a grommet loosely positioned on said wire adjacent the end of each of the blanks having the blades for providing a bearing surface against which said blank rotates, said grommet adapted to create noise as said rotating blank bears against said grommet.

9. A lure according to claim 1, wherein the distance defined by the space between said first journal and said second and third journals is at least twice the dial of the wire.

10. A lure according to claim 1, wherein each of said spinners includes a plurality of holes formed in the blades.

11. A lure according to claim 7, and including a plurality of filaments attached to said shank adjacent said hook.

12. A lure according to claim 7, and including adjusting means for adjusting the angle of articulation of the hook in relation to the shank.

13. A lure according to claim 7, and including two spinners positioned for coaxial rotation on a single wire.

14. A lure according to claim 13, wherein the two spinners are mounted for rotation on the single wire on substantially the same axial position on said wire.

15. A fishing lure according to claim 14, wherein said spinner includes a plurality of holes formed in the blades.

16. A fishing lure, comprising:

(a) a fish hook;

(b) a elongate wire shank mounting said hook on one end thereof;

(c) a cross-wire formed on the end of the shank opposite said hook;

(d) a spinner carried on the same end of the shank on which the cross-wire is mounted;

(e) first and second generally fish-shaped metal plates mounted on respective opposing ends of said cross-wire;

(f) said spinner comprising a metal blank deformed to define a pair of hydrodynamic blades on one end of said metal blank, said metal blank having lugs at opposite ends thereof bent in parallel planes at substantially right angles to the plane of the blank on a first major side of said blank, said lugs having respective holes therein for receiving a spinner-supporting wire along an axis of rotation, said holes being enlarged in relation to the diameter of the wire in order to permit free rotation of said spinner on said blank;

(g) a first elongate journal stamped from the metal blank between said lugs and extending outwardly from a second major side of said blank opposite from said first major side and extending along the axis of rotation of said spinner, said first journal extending outwardly from the second major side a distance sufficient to permit said spinner to rotate concentrically and symmetrically around said wire.

17. A fishing lure according to claim 16, wherein said blank includes:

(a) a second journal positioned between one of said lugs and one end of said first journal and extending outwardly from the first major side adjacent one of said lugs;

(b) a third journal positioned between the other of said lugs and the other end of said first journal and extending outwardly from the first major side adjacent the other of said lugs said second and third journals extending outwardly from the first major side a distance sufficient to provide a spaced bearing surface for said spinner to permit said spinner to rotate concentrically and symmetrically around said wire.

18. A fishing lure according to claim 16, and including a grommet loosely positioned on said wire adjacent the end of the blank having the blades for providing a bearing surface against which said blank rotates, said grommet adapted to create noise as said rotating blank bears against said grommet.

19. A fishing lure according to claim 16, wherein the distance defined by the space between said first journal and said second and third journals is at least twice the diameter of the wire.

* * * * *